B. F. AND G. P. MERTZ.
GRATER.
APPLICATION FILED MAY 18, 1920.

1,414,657.

Patented May 2, 1922.

B. F. Mertz
G. P. Mertz
Inventors

UNITED STATES PATENT OFFICE.

BOYD F. MERTZ AND GEORGE P. MERTZ, OF NORTHUMBERLAND, PENNSYLVANIA.

GRATER.

1,414,657.	Specification of Letters Patent.	Patented May 2, 1922.

Application filed May 18, 1920. Serial No. 382,216.

*To all whom it may concern:*

Be it known that we, BOYD F. MERTZ and GEORGE P. MERTZ, citizens of the United States, residing at Northumberland, in the county of Northumberland, State of Pennsylvania, have invented certain new and useful Improvements in Graters; and we do hereby declare the following to be a full, clear, and exact description of the invention, such as will enable others skilled in the art to which it appertains to make and use the same.

This invention relates to vegetable cutters, and more especially to those which are rotary; and the object of the same is to produce a machine for grating cocoanut, horse radish, and the like.

A feature of the machine consists in building it in separate compartments in which different substances can be simultaneously treated, and providing means for exhausting the fumes from one compartment in case horse radish is grated therein.

Another feature consists in providing means for feeding the material to the cylinder, either in bulk through a hopper or by hand through a door.

Another feature is the brush removably mounted on the main shaft and by which the material to be grated can be given a preliminary treatment.

Details are set forth below and shown in the drawings wherein.

Figure 1:
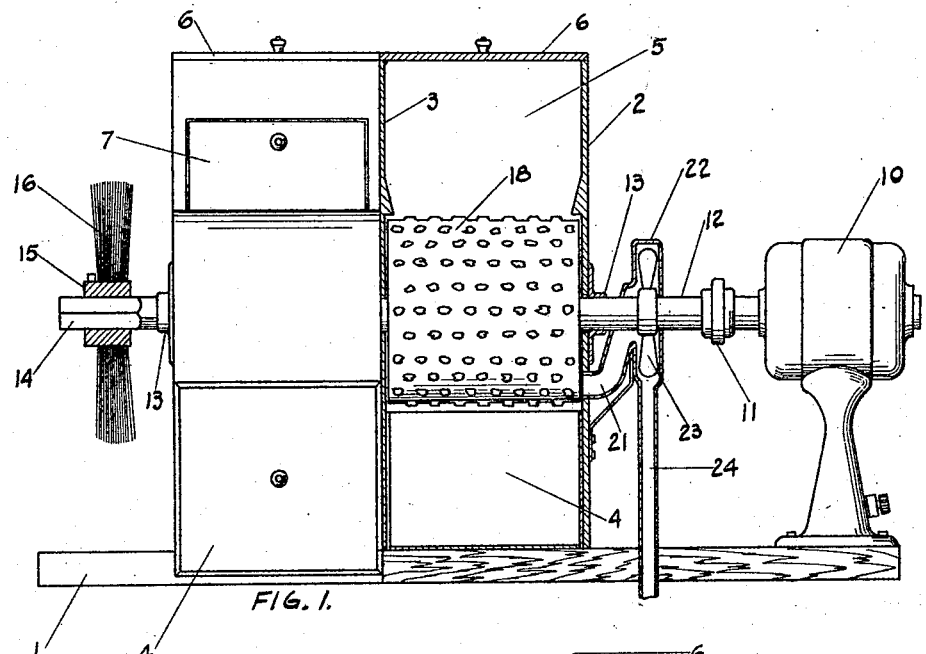
Figure 1 is a front elevation of this machine with the right hand compartment and the fan casing and air ducts in section.
Figure 2:
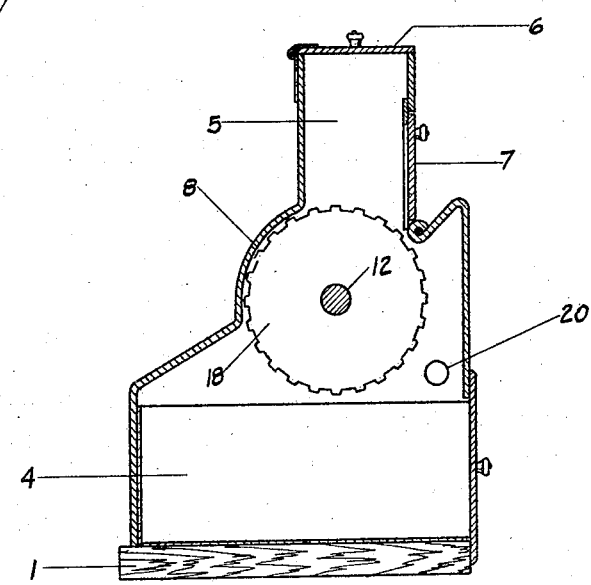
Figure 2 is a transverse vertical section, showing one cylinder in elevation.

Mounted on a base 1 is an upright casing 2 having a central vertical partition 3 dividing it into two compartments, each having a drawer 4 in its lower part, a hopper 5 in its upper part, a lid 6 for the hopper, a door 7 in its front, and a curved rear wall 8. An electric motor 10 is mounted on the base and coupled at 11 to a main shaft 12 which is mounted in bearings 13 and extends through both compartments, its further end being squared as at 14 to receive the hub 15 of a wire brush 16 which may be mounted thereon, and by means of which the vegetable to be grated can be given a preliminary treatment. For instance, the inner shell of a cocoanut can be removed by this brush, or the root of horse radish can be brushed and cleaned. Fast on the shaft within the two compartments are grating cylinders 18 whose roughened peripheries grind the material being treated. This material may be fed into the hopper by raising the lid, and allowed to gravitate onto the grinding cylinder, or the door 7 may be opened and the material fed in pieces by hand onto the hopper and in either case the ground particles drop into the drawer. It is obvious that different substances can be ground simultaneously in the two parts of the structure.

Opening from the grinding space at about the point 20 is a duct 21 which leads into a casing 22 containing a fan 23 mounted on the shaft 12, and an outlet pipe or duct 24 leads from this casing to a remote point. In the right hand compartment I will preferably grind horse radish or some material which throws off unpleasant fumes or odors, and obviously these are drawn out by the fan and delivered through the duct 24 at a point remote from the operator. The motor can be stopped and started by controlling the current thereto, or it would be possible to drive the main shaft by other means. The brush may be left on the shaft, or may be applied only when it is to be used. It is quite possible to replace this brush with one having softer bristles or a burnishing surface, or even to replace it with a grindstone or some other element which may be used in the shop or household or wherever this grinder is to be used.

It should further be noted that the suction spout of the exhaust fan is in communication with the casing at a point adjacent to the plane of the front wall of the latter above the front end of the drawer 4, so that when the latter is opened or drawn out to give access thereto for the removal of a portion of the grated contents thereof, the fan tends to produce an inward current of air through the space opened by the drawer to prevent the fumes of the horseradish or other material from inconveniencing the operator while so engaged. The advantage in arranging the suction spout as indicated is also apparent when the drawer is closed, should there be any looseness in the fit of the drawer or failure to tightly close the same in the intervals between the periodic removal of the grated contents for the purpose of filling the demands of customers. It is common to employ devices of this general character at the stands of merchants handling ground horseradish and like substances so that the trade may be supplied with the freshly ground product, and it is because of the necessity of grinding the material as it is sold and therefore of having the apparatus within convenient reach at the stand or distributing point, that there is a necessity for disposing of the fumes to prevent the distress to the dealer which otherwise would be occasioned thereby.

What is claimed is:

An apparatus for grinding horseradish and like products having a casing provided with a motor driven grinding cylinder and fitted with a movable drawer in receiving relation with the cylinder and adapted to be opened from time to time to permit of the removal of the ground product, and a suction fan actuable by the cylinder driving motor and having a suction spout communicating with the interior of the cylinder casing at a point adjacent to the periphery of the drum and above the upper edge of the front end of the drawer for producing an inward current of air when the drawer is opened, said fan being provided with a discharge pipe having its outlet at a point remote from the casing.

In testimony whereof, we affix our signatures, in the presence of two witnesses.

BOYD F. MERTZ.
GEORGE P. MERTZ.

Witnesses:
JOHN H. VINCENT,
T. L. STURGEON.